United States Patent
Flores et al.

(10) Patent No.: US 11,781,013 B2
(45) Date of Patent: Oct. 10, 2023

(54) THERMOPLASTIC COMPOSITES AND CORRESPONDING FABRICATION METHODS AND ARTICLES

(71) Applicant: SOLVAY SPECIALTY POLYMERS USA, LLC, Alpharetta, GA (US)

(72) Inventors: Joel Flores, Alpharetta, GA (US); Pierre-Yves Lahary, Lyons (FR); Anthony Bocahut, Lyons (FR); Chloé Epinat, Champdieu (FR)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 974 days.

(21) Appl. No.: 16/495,568

(22) PCT Filed: Feb. 21, 2018

(86) PCT No.: PCT/EP2018/054276
§ 371 (c)(1),
(2) Date: Sep. 19, 2019

(87) PCT Pub. No.: WO2018/172009
PCT Pub. Date: Sep. 27, 2018

(65) Prior Publication Data
US 2020/0109283 A1    Apr. 9, 2020

(30) Foreign Application Priority Data

Mar. 21, 2017 (EP) .................... 17305312

(51) Int. Cl.
*C08L 77/06* (2006.01)
*C08K 3/014* (2018.01)
*C08K 3/04* (2006.01)
*C08K 3/16* (2006.01)
*C08K 7/06* (2006.01)
*C08J 5/24* (2006.01)

(52) U.S. Cl.
CPC ............. *C08L 77/06* (2013.01); *C08J 5/243* (2021.05); *C08K 3/014* (2018.01); *C08K 3/04* (2013.01); *C08K 3/16* (2013.01); *C08K 7/06* (2013.01); *C08J 2377/06* (2013.01)

(58) Field of Classification Search
CPC .................................................. C08J 5/243
See application file for complete search history.

(56) References Cited

U.S. PATENT DOCUMENTS

| 4,607,073 | A | 8/1986 | Sakashita et al. |
| 5,670,608 | A | 9/1997 | Oka et al. |
| 2011/0272854 | A1 | 11/2011 | Elia et al. |
| 2016/0297120 | A1 | 10/2016 | Lamberts et al. |

FOREIGN PATENT DOCUMENTS

| CN | 1356348 A | 7/2002 |
| JP | 2006-274061 A | 10/2006 |
| WO | WO 2015/053181 A1 * | 4/2015 |

OTHER PUBLICATIONS

WO 2015/053181 A1 machine translation (Apr. 2015).*
ASTM D5336-15—Standard Classification System and Basis for Specification for Polyphthalamide (PPA) Injection Molding Materials, 2015, 5 pages.
ASTM D3418-08—Standard Test Method for Transition Temperatures and Enthalpies of Fusion and Crystallization of Polymers by Differential Scanning Calorimetry, 2008, 7 pages.
ASTM E1131-08—Standard Test Method for Compositional Analysis by Thermogravimetry, 2008, 6 pages.

* cited by examiner

*Primary Examiner* — Ana L. Woodward
(74) *Attorney, Agent, or Firm* — Osha Bergman Watanabe & Burton LLP

(57) ABSTRACT

Described herein are thermoplastic composites including a polymer matrix, having a at least one semi-crystalline polyphthalamide ("PPA") polymer, and at least one continuous reinforcing fiber. It was surprisingly discovered that incorporation of semi-crystalline PPA polymers, having a selected melt profile, into the polymer matrix provided for crack-free thermoplastic composites. Based at least in part on the semi-crystalline structure of PPA polymers, the thermoplastic composite can have improved tensile strength, chemical resistance and thermal stability, relative to composites incorporating an amorphous PPA polymer. The composites can be formed using melt impregnation techniques, well known in the art. The composites can be desirably used in a wide range of application settings including, but not limited to automotive, aerospace, automotive and oil and gas and mobile electronic device applications.

14 Claims, 1 Drawing Sheet

THERMOPLASTIC COMPOSITES AND CORRESPONDING FABRICATION METHODS AND ARTICLES

RELATED APPLICATIONS

This application is a U.S. national stage entry under 35 U.S.C. § 371 of International Application No. PCT/EP2018/054276 filed Feb. 21, 2018, which claims priority to European application No. 17305312.5, filed on Mar. 21, 2017; the whole content of this application is herein incorporated by reference.

FIELD OF THE INVENTION

The invention relates to thermoplastic composites including a polymer matrix, having a polyphthalamide polymer, and continuous reinforcing fibers. The invention further relates to the fabrication of thermoplastic composites. The invention still further relates articles incorporating the thermoplastic composites.

BACKGROUND OF THE INVENTION

Thermoplastic composites are gaining a significant amount of attention as a potential replacement for metal parts. Relative to metal parts, thermoplastic composites can provide a significant reduction in weight and cost, while simultaneously providing desirable or superior mechanical performance. One type of polymer used in thermoplastic composites is amorphous polyphthalamide ("PPA") polymers. The popularity of amorphous PPA polymers in thermoplastic composites is at least in part due to the fact that they form crack-free composites. However, due to their success to date, thermoplastic composites are being investigated for use in a wider variety of application settings, which require greater mechanical performance (e.g. tensile strength) and chemical performance (e.g. chemical resistance). In general, for many of these applications settings, amorphous PPA polymers are not able to meet the increased mechanical performance and chemical performance requirements of these new application settings.

DETAILED DESCRIPTION OF THE INVENTION

Figure 1:
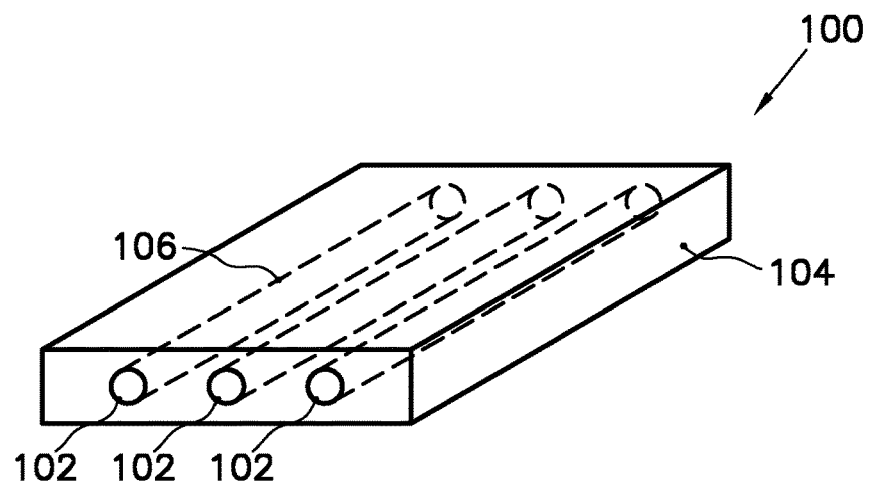
FIG. 1 is a schematic depiction showing a perspective view of an embodiment unidirectional composite.

Described herein are thermoplastic composites including a polymer matrix, having a at least one semi-crystalline polyphthalamide ("PPA") polymer, and at least one continuous reinforcing fiber. It was surprisingly discovered that incorporation of semi-crystalline PPA polymers, having a selected melt profile, into the polymer matrix provided for crack-free thermoplastic composites. In general, fabrication of thermoplastic composites from semi-crystalline PPA polymers results in composites having significant visible cracking, which compromises the mechanical integrity of the composite and makes in undesirable for use in many application settings. Applicant discovered that crack-free thermoplastic composites having a semi-crystalline polymer matrix can be formed from semi-crystalline PPA polymers having a selected inherent viscosity, crystallinity and difference between onset degradation temperature and the melting temperature. Based at least in part on the semi-crystalline structure of PPA polymers, the thermoplastic composite can have improved tensile strength, chemical resistance and thermal stability, relative to composites incorporating an amorphous PPA polymer. The composites can be formed using melt impregnation techniques, well known in the art. The composites can be desirably used in a wide range of application settings including, but not limited to automotive, aerospace, oil and gas and mobile electronic device applications.

The Polymer Matrix

The polymer matrix includes at least one semi-crystalline PPA polymer and, optionally, at least one additive. It was surprisingly found that semi-crystalline PPA polymers having a selected processing profile provided for crack free thermoplastic composite. The melt profile refers to a combination of properties of the semi-crystalline PPA polymer. The properties are the inherent viscosity ("$\eta_{inh}$"), the crystallinity, and the thermal window. As described in detail below, the crystallinity of the PPA polymers is measured according to the heat of fusion ("$\Delta H_f$"). The thermal window refers to the difference in the onset degradation temperature ("Td") and the melting temperature ("Tm") of the PPA polymer, as represented by the following formula: $T_d-T_m$.

The thermoplastic composite includes at least 20 wt. %, at least 25 wt. %, at least 30 wt. %, at least 35 wt. % or at least 40 wt. % of the polymer matrix, relative to the total weight of the composite. Additionally or alternatively, the thermoplastic composite includes no more than 80 wt. %, no more than 70 wt. %, no more than 60 wt. %, no more than 55 wt. %, no more than 50 wt. % or no more than 45 wt. % of the polymer matrix, relative to the total weight of the composite.

The Polyphthalamide Polymer

The polymer matrix includes at least one semi-crystalline PPA polymer. As used herein, a semi-crystalline PPA polymer is a PPA polymer having a heat of fusion that is at least 3 joules per gram ("J/g"). Furthermore, a PPA polymer refers to any polymer including recurring unit ($R_{PA}$) and recurring unit ($R^*_{PA}$), where the total concentration of recurring unit ($R_{PA}$) and recurring unit ($R^*_{PA}$) is at least 50 mole percent ("mol %"), relative to the total number of moles of recurring units in the polymer. Recurring units ($R_{PA}$) and ($R^*_{PA}$) are represented by the following formulae, respectively:

$$[-M_A-M_B-] \qquad (1)$$

and $$[-M^*_A-M^*_B-] \qquad (2),$$

where -$M_A$- and -$M^*_A$- are respectively represented by the following formula:

-$M_B$- is represented by the following formulae:

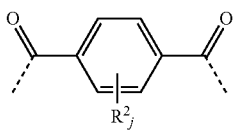

(5)

and
-$M_B$*- is represented by one of the following formulae:

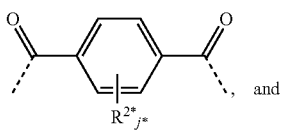

(6)

, and

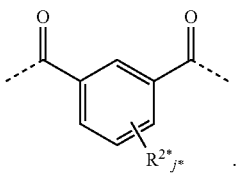

(7)

$R^1$ and $R^2$, $R^{1*}$ and $R^{2*}$, at each instance, is independently selected from the group consisting of a halogen, an alkyl, an alkenyl, an ether, a thioether, an ester, an amide, an imide, an alkali or alkaline earth metal sulfonate, an alkyl sulfonate, an alkali or alkaline earth metal phosphonate, an alkyl phosphonate, an amine, and an quaternary ammonium; i and i*, at each instance, is an independently selected integer from 0 to 2; j and j* are independently selected integers from 0 to 4; and n and n* are independently selected integers from 5 to 9. For clarity, in Formulae (3) and (4), the carbon atom in each —$(CR^1_i)$— and each —$(CR^{1*}_{i*})$— has, respectively, 2-i and 2-i* hydrogen atoms bonded to it. Similarly, in Formulae (5)-(7), the central benzene ring has 4-j (Formula (5)) and 4-j* (Formulae (6) and (7)) ring carbons bonded to a hydrogen atom. For example, referring to Formula (3), if i=1 for one of the n units —$(CR^1)$—, -$M_A$-, in one embodiment, is represented by —NH—$(CHR^1)$—$(CR^1_i)_{n-1}$—NH—. As another example, referring to Formula (5), if j=1, 3 of the benzyl carbons are bonded to a hydrogen atom and one is bonded to $R^2$. For the PPA polymers of interest herein, either (i) -$M_A$- and -$M^*_A$- are the same and -$M_B$- and -$M^*_B$- are distinct or (ii) -$M_A$- and -$M^*_A$- are distinct and -$M_B$- and -$M^*_B$- are the same. As used herein, a dashed bond (----) represents a bond to an atom outside the drawn structure. In some embodiments, the total concentration of recurring unit ($R_{PA}$) and recurring unit ($R^*_{PA}$) in the PPA polymer is at least 60 mol %, at least 70 mol %, at least 80 mol %, at least 90 mol %, at least 99 mol % or at least 99.5 mol % recurring unit ($R_{PA}$), relative to the total number of moles of recurring units in the PPA polymer.

For ease of reference, sometimes, -$M_A$- and -$M_B$- are respectively referred to as a diamine diradical and a dicarboxylic acid diradical. The person of ordinary skill in the art will recognize that H-$M_A$-H and HO-$M_B$-OH are a diamine and a dicarboxylic acid monomer, respectively, and that polycondensation of H-$M_A$-H with HO-$M_B$-OH results in formation of the recurring unit ($R_{PA}$) (amide bond between -$M_A$- and -$M_B$- and the loss of water). Accordingly, reference to -$M_A$- as a diamine diradical refers to the radical formed by the deprotonation of the terminal —H atoms in the formula H-$M_A$-H. Similarly, reference to -$M_B$- as a dicarboxylic acid diradical refers to the radical formed by the dehydroxylation of the terminal —OH groups in the formula HO-$M_B$-OH. For example, reference to -$M_A$- as a 1,6-hexamethylenediamine diradical refers to Formula (3), where each i is zero and n is 6. As another example, reference to -$M_B$- as a terephthalic acid diradical refers to Formula (5), where j is zero. Analogous terminology is used with respect to -$M^*_A$- and -$M^*_B$-.

As noted above, in some embodiments, -$M_A$- and -$M^*_A$- are the same and -$M_B$- and -$M^*_B$- are distinct. In such embodiments, -$M^*_B$- is represented by Formula (7). Furthermore, in embodiments in which -$M_A$- and -$M^*_A$- are the same and -$M_B$- and -$M^*_B$- are distinct, the concentration of recurring unit ($R_{PA}$), relative to recurring unit ($R^*_{PA}$) (moles recurring unit ($R_{PA}$):moles recurring ($R^*_{PA}$)), is no more than about 65:35, no more than about 60:40, no more than about 55:45 or no more than about 50:50. In some embodiments, each i and i* are zero, each j or j* are zero, or both. In some embodiments, -$M_A$- and -$M^*_A$- are diradicals of a diamine selected from the group consisting of 1,5-diaminopentane; 2-methyl-1,5-diaminopentane; 1,6-hexamethylenediamine; 3-methyl-1,6-hexamethylenediamine; 2,5-dimethyl-1,6-hexamethylenediamine; 2,2,4-trimethyl-1,6-hexamethylenediamine; 2,4,4-trimethyl-1,6-hexamethylenediamine; 1,7-diaminoheptane; 1,8-diaminooctane; and 2-methyl-1,8-octanediamine ("MODA") and 1,9-diaminononane ("NMDA"). Additionally or alternatively, -$M_B$- is a terephthalic acid diradical and -$M^*_B$- is an isophthalic acid diradical. Excellent results were achieved with -$M_A$- and -$M^*_A$- as 1,6-hexamethylenediamine diradicals, -$M_B$- as a terephthalic acid diradical and -$M^*_B$- as an isophthalic acid diradical.

In the other embodiments, -$M_A$- and -$M^*_A$- are distinct and -$M_B$- and -$M^*_B$- are the same. In such embodiments, n is 9 and n* is 8; -$M^*_B$- is represented by Formula (6); and at least one $R^{1*}$ is represented by the formula: —$(CH_2)_m$—$(CH_3)$, where where m is an integer from 0 to 3, from 0 to 2, or from 0 to 1, preferably 0. Furthermore, in embodiments in which -$M_A$- and -$M^*_A$- are distinct and -$M_B$- and -$M^*_B$- are the same, the concentration of recurring unit ($R_{PA}$), relative to recurring unit ($R^*_{PA}$) (moles recurring unit ($R_{PA}$): moles recurring ($R^*_{PA}$)), is no more than about 75:25, no more than about 70:30, no more than about 65:35, no more than 60:40, no more than 55:45 or no more than about 50:50. In some such embodiments, each i is zero. Preferably, -$M_A$- is a NMDA diradical and -$M^*_A$- is MODA diradical. Preferably, -$M_B$- and -$M^*_B$- are terephthalic acid diradicals.

In some embodiments, the at least one semi-crystalline PPA polymer can include additional recurring units, distinct from recurring unit ($R_{PA}$) and recurring unit ($R^*_{PA}$). In such embodiments, the total concentration of recurring unit ($R_{PA}$), recurring unit ($R^*_{PA}$) and other distinct recurring units represented by a formula according to Formula (1), is at least 50 mol %, at least 60 mol %, at least 70 mol %, at least 80 mol %, at least 90 mol %, at least 99 mol % or at least 99.5 mol %, relative to the total number of moles of recurring units in the polymer.

As noted above, it was surprisingly found crack-free composites can be formed from a polymer matrix incorporating a semi-crystalline PPA polymer with specifically selected melt profile. The semi-crystalline PPA polymers of interest herein have an inherent viscosity of at least 0.8 deciliters per gram ("dL/g"). In some embodiments, the at least one semi-crystalline PPA polymer has an inherent viscosity of at least 0.9 dL/g or at least 1.0 dL/g. Additionally or alternatively, the PPA polymers can have an inherent viscosity of no more 1.6 dL/g, 1.5 dL/g or 1.4 dL/g. The inherent viscosity can be measured as described in the Examples below. The crystallinity of the PPA polymers can be determined by measuring the heat of the fusion of the PPA polymer. The PPA polymers of interest herein have a heat of fusion of no more than 50 Joules per gram ("J/g"). In some embodiments, the PPA polymers have a heat of fusion of no more than 45 J/g or no more than 40 J/g. The heat of fusion can be measured as described in the examples. Still further, the PPA polymers have a selected thermal window, defined by the difference between $T_d$ and $T_m$ ($T_d-T_m$), of at least 60° C. In some embodiments, the PPA polymers have a thermal windows of no more than 200° C. or no more than 120° C. Td and Tm can be measured as described in the examples below.

The concentration of the at least one semi-crystalline PPA polymer in the polymer matrix is at least 50 wt. %, at least 60 wt. %, at least 70 wt. % at least 80 wt. %, at least 90 wt. %, at least 95 wt. % or at least 99.5 wt. %, relative to the total weight of the matrix composition. Of course the at least one semi-crystalline PPA polymer of the polymer matrix can include a plurality of distinct semi-crystalline PPA polymers. In such embodiments, the total concentration of the semi-crystalline PPA polymers is within the ranges described above.

Additives

In some embodiments, in addition to the at least one semi-crystalline PPA polymer, the polymer matrix can further include optional additives, including but not limited to, antioxidants (e.g. ultraviolet light stabilizers and heat stabilizers), processing aids, nucleating agents, lubricants, flame retardants, a smoke-suppressing agents, anti-static agents, anti-blocking agents, and conductivity additives such as carbon black.

In some embodiments, antioxidants can be particularly desirable additives. Antioxidants can improve the heat and light stability of the polymer matrix in the composite. For example, antioxidants that are heat stabilizers can improve the thermal stability of the composite during manufacturing (or in high heat application settings), for example, by making the polymer processable at higher temperatures while helping to prevent polymer degradation. Additionally, the antioxidants that are light stabilizers can further prevent against polymer degradation during use of the composite application settings where it is exposed to light (e.g. external automobile or aircraft parts). Desirable antioxidants include, but are not limited to, copper salts (e.g. CuO and $Cu_2O$), alkaline metal halides (e.g. CuI, KI, and KBr, including combinations of alkaline metal halides such as, but not limited to, CuI/KI), hindered phenols, hindered amine light stabilizers ("HALS") (e.g. tertiary amine light stabilizers) and organic or inorganic phosphorous-containing stabilizers (e.g. sodium hypophosphite or manganese hypophosphite).

The total concentration of additives in the polymer matrix is 0 wt. %, at least 0.1 wt. %, at least 0.2 wt. %, at least 0.3 wt. %, or at least 0.4 wt. %, relative to the total weight of the polymer matrix. Additionally or alternatively, the total concentration of additives in the polymer matrix is no more than 10 wt. %, no more than 8 wt. %, no more than 6 wt. %, no more than 5 wt. %, no more than 4 wt. %, no more than 3 wt. %, no more than 2 wt. % or no more than 1 wt. %, relative to the total weight of the polymer matrix.

The Reinforcing Fibers

The thermoplastic composite includes at least one continuous reinforcing fiber. The at least one continuous reinforcing fiber is selected from glass fiber, carbon fibers, aluminum fiber, titanium fiber, magnesium fiber, boron carbide fibers, rock wool fiber, steel fiber, aramid fiber, natural fiber (e.g. cotton, linen and wood) and any combination of one or more, thereof. Preferably, the at least one continuous reinforcing fiber is glass fiber or carbon fiber. The at least one reinforcing fiber is a continuous reinforcing fiber, meaning the reinforcing fibers have an average length in the longest dimension of at least 5 millimeters ("mm"), at least 10 mm, at least 25 mm or at least 50 mm.

The thermoplastic composite includes at least 20 wt. %, at least 25 wt. %, at least 30 wt. %, at least 35 wt. %, at least 40 wt. %, at least 45 wt. %, at least 50 wt. % or at least 55 wt. % of the continuous reinforcing fiber, relative to the total weight of the thermoplastic composite. Additionally or alternatively, the thermoplastic composite includes no more than 80 wt. %, no more than 75 wt. %, no more than 70 wt. %, no more than 65 wt. % or no more than 60 wt. % of the continuous reinforcing fiber, relative to the total weight of the thermoplastic composite. In embodiments in which the at least one continuous reinforcing fiber is a plurality of continuous reinforcing fibers, the total concentration of continuous reinforcing fibers is within the ranges above.

The Composites and Composite Fabrication

The composites include the reinforcing fiber impregnated with the polymer matrix. In some embodiments, the composites can be unidirectional composites. In other embodiments, the composite can be a multidirectional composite, in which the fibers have a more complex structure.

With respect to unidirectional composites (e.g. tapes), the orientation of the reinforcing fibers within the polymer matrix material is generally aligned along the length of the reinforcing fibers (the longest dimensions of the fiber). Unidirectional composites are also sometimes referred to as composite tapes. FIG. 1 is a schematic depiction showing a perspective view of an embodiment unidirectional composite. Referring to FIG. 1, tape 100 includes reinforcing fibers 102 and polymer matrix 104. Reinforcing fibers 102 are generally aligned along their length. Dashed lines 106 (not all labelled, for clarity) denote the orientation of continuous reinforcing fibers 102. As used herein, generally aligned fibers are oriented such that at least 70%, at least 80%, at least 90% or at least 95% of the reinforcing fibers have length that is within 30 degrees, within 25 degrees, within 20 degrees, within 15 degrees, or within 10 degrees along a length of one of the fibers.

Figure 2:
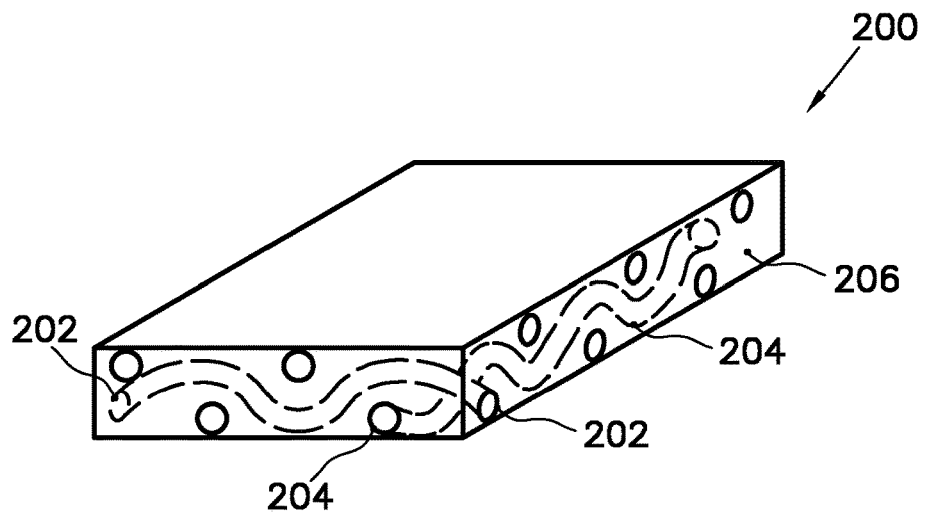
FIG. 2 is a schematic depiction showing a perspective view of an embodiment of a multidirectional composite in which the reinforcing fibers are oriented as a woven fabric.
Figure 3:
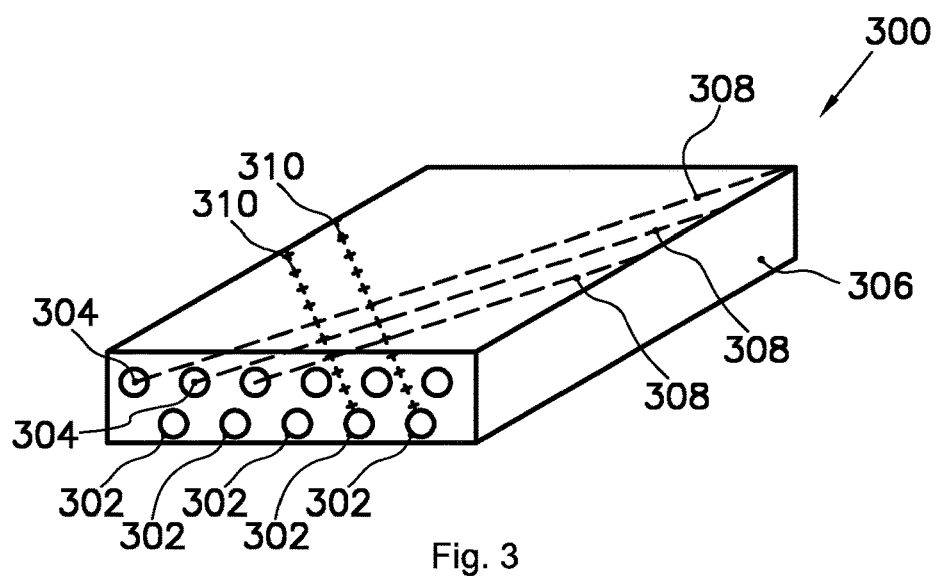
FIG. 3 is a schematic depiction showing a perspective view of an embodiment of a multidirectional composite in which the continuous reinforcing fibers are oriented as a layered fabric.

In other embodiments, the composite can be a multidirectional composite (e.g. laminate). As noted above, unidirectional composites have fibers that are generally aligned along a single direction. Because the tensile strength of the composite is greater along the length of the fiber, unidirectional composites have excellent tensile strength along a single dimension, and reduced tensile strength along other (e.g. perpendicular) directions. In contrast, multidirectional composites have reinforcing fibers aligned along multiple dimensions and, therefore, have improved tensile strength in multiple dimensions (e.g. more isotropic). In such embodiments, the reinforcing fibers in the polymer matrix can be arranged as a woven fabric or a layered fabric or any combination of one or more therefore. FIG. 2 is a schematic depiction showing a perspective view of an embodiment of a multidirectional composite in which the reinforcing fibers are oriented as a woven fabric. Referring to FIG. 2, multidirectional composite 200 includes polymer matrix 206 and reinforcing fibers 202 and 204, which are generally perpendicular to each other. For clarity, not all reinforcing fibers are labelled in FIG. 2. In some embodiments, each reinforcing fibers 202 and 204 can include bundle of reinforcing fibers. For example, in some embodiments, reinforcing fibers 202 and 204 can be a yarn or layer (e.g. a planar distribution of single reinforcing fibers adjacent each other) of reinforcing fibers. FIG. 3 is a schematic depiction showing a perspective view of an embodiment of a multidirectional composite in which the continuous reinforcing fibers are oriented as a layered fabric. Referring to FIG. 3, multidirectional composite 300 includes reinforcing fibers 302 and 304 and polymer matrix 306. For clarity, not all reinforcing fibers 304 are labelled. Reinforcing fibers 302 and 304 are present in polymer matrix 306 as different layers, with the reinforcing fibers 302 generally aligned parallel with each other and reinforcing fibers 304 generally aligned parallel with each other. Reinforcing fibers 302 are also generally aligned at an angle with reinforcing fibers 304. Dashed lines 308 indicate the alignment of fiber 304 within the multidirectional composite 300. Pluses ("+") 310 indicate the alignment of fibers 302 within multidirectional composite 300. For clarity, not all fibers 302 and 304 are indicated with dashed lines or pluses. In some embodiments, the angle between fibers 302 and 304 along their respective lengths is at least 15 degrees, at least 30 degrees or at least 40 degrees and no more than about 75 degrees, no more than about 60 degrees or no more than about 50 degrees. Of course, the layered fabric can have additional layers of reinforcing fibers, aligned at the same angle or different angles as the reinforcing fibers in another layer in the multidirectional composite.

The composites can be fabricated by methods well known in the art. In general, regardless of the type of method, composite fabrication includes impregnation of the reinforcing fibers with the polymer matrix material ("melt impregnation"), and subsequent cooling to room temperature (20° C. to 25° C.) form the final solid composite. The melt impregnation includes contacting the reinforcing fibers with a melt of the polymer matrix material. To make the polymer matrix material processable, the melt is at a temperature of at least Tm* to less than Td*, where Tm* is the melt temperature of the PPA polymer in the polymer matrix having the highest melt temperature and Td* is the onset decomposition temperature of the PPA polymer having the lowest onset decomposition temperature in the melt. In some embodiments, melt impregnation can further include mechanical compression of the melt against the fibers. For example, in thermo-pressing, the polymer matrix material is heated to form a melt and mechanically compressed against the fibers simultaneously. In other melt impregnation embodiments incorporating mechanical compression, the fibers can first be contacted with the melt and subsequently mechanically compressed. Subsequent to melt impregnation, the impregnated reinforcing fibers are cooled to form a solid composite. In some embodiments, the composite can be shaped to a desired geometry prior to be cooled to room temperature. In some such embodiments, subsequent to melt impregnation or prior to or during cooling, the impregnated reinforcing fibers can be passed through a die to form the composite having the desired geometry.

One example of a composite fabrication method includes pultrusion. In pultrusion, a plurality of fibers are aligned along their length and pulled in a direction along their length. In some embodiments, the plurality of fibers is delivered from a spool(s) of the reinforcing fiber. To impregnate the fibers, the fibers are pulled through a bath including a melt of the polymer matrix. After being pulled through the melt, in some embodiments, the impregnated fibers can be further heated to further aid in the impregnation. Additionally or alternatively, the impregnated fibers can be pulled through a die and to provide the desired shape to the composite, prior to cooling to room temperature. Pultrusion can be particularly desirable in the formation of unidirectional composites. Another example of a composite fabrication method includes a slurry process. In a slurry process, a slurry is formed by adding the polymer matrix, in powdered form, to a liquid medium to create a suspension. The slurry is coated onto a surface of the fibers, for example, by passing the fibers through a bath of the slurry. Subsequently, the coated fibers are then heated and consolidated (e.g. by heated mechanical rollers). Slurry fabrication can be desirable for the formation of composite tapes. Yet another example of a composite fabrication method involves direct powder deposition. In such a method, the polymer matrix, in powder form, is deposited onto the surface of the fibers and subsequently heated to melt the polymer matrix. Direct powder deposition can be desirable to form woven fabric compositions.

In some embodiments, composited can be formed by thermopressing of a two or more composites. In such embodiments, two or more composites can be thermopressed (e.g. heated and mechanically pressed together) to form a new composite. For example, referring to FIG. 3, composite 300 can be formed by thermopressing two unidirectional composites (e.g. composite 100), oriented such the reinforcing fibers of each composite are at the desired angle to one another. As another example, referring to FIG. 2, one or more composites according to composite 200 can be pressed together to form another composite. In some such embodiments, prior to thermopressing, each composite can be oriented to achieve the desired relative fiber alignment between each of the composites being thermopressed.

In some embodiments, the composite can be overmolded with another polymer composition. In some such embodiments, a polymer composition including reinforcing fibers can be injection molded onto a portion of the composite. In such embodiments, the reinforcing fibers generally have a length of less than 5 mm. In one embodiment, a polymer composition including a polyamide and reinforcing glass or carbon fibers can be injection molded onto at least a portion of the thermoplastic composite. The polyamide can be an amorphous or semi-crystalline polyamide, preferably a semi-crystalline polyamide.

Articles

The thermoplastic composites described herein can be desirably incorporated into articles for use in a wide variety of application settings. With respect to automotive applications, the thermoplastic composites can be integrated into automotive components including, but not limited to, pans (e.g. oil pans), panels (e.g. exterior body panels, including but not limited to quarter panels, trunk, hood; and interior body panels, including but not limited to, door panels and dash panels), side-panels, mirrors, bumpers, bars (e.g., torsion bars and sway bars), rods, suspensions components (e.g., suspension rods, leaf springs, suspension arms), and turbo charger components (e.g. housings, volutes, compressor wheels and impellers). The thermoplastic composites described herein can also be desirably integrated into aerospace components, oil and gas drilling components (e.g. downhole drilling tubes, chemical injection tubes, undersea umbilicals and hydraulic control lines) and mobile electronic device components.

Should the disclosure of any patents, patent applications, and publications which are incorporated herein by reference conflict with the description of the present application to the extent that it may render a term unclear, the present description shall take precedence.

EXAMPLES

The following examples demonstrate the formation and structural integrity of continuous fiber reinforced composites including a PPA polymer matrix having a semi-crystalline PPA polymer and continuous carbon fibers.

The Semi-Crystalline PPA Polymers

To fabricate the composite samples, 10 different semi-crystalline PPA polymers were used. PPA polymer 1A was a PA6T,6I copolymers, having 50:50 ratio of 6T:6I and was prepared as follows: A stirred batch vessel was charged with 8.5 kg DI water, 21.12 kg of hexamethylenediamine and a dicarboxylic acid component consisting of 9.83 kg of terephthalic acid ("TA") and 9.83 kg of isophthalic acid ("IA"). The reactor was also charged with 9.4 g phosphorus acid and 204.7 g of glacial acetic acid. A salt solution was obtained by heating the above described mixture at 145° C. The content was pumped continuously to a reactor zone maintained at about 180 psig and 216° C., then to a zone maintained at about 298° C. and 1800 pounds per square inch gage ("psig"), then through a tubular reactor at 100 psig and heated with oil at 349° C. and finally into a vented twin-screw extruder equipped with a forward vacuum vent. The die temperature was set at 335° C. The finished polymer was extruded through a strand die into a water bath at a through-put rate of about 5.5 6.5 kg/hr and then the strands were chopped into pellets.

PPA polymers 2A to 2C were obtained from Solvay Specialty Polymers USA, L.L.C. and are commercially available as Amodel® PPA. PPA polymers 2A to 2C were PA6T,6I copolymers, having 70:30 ratio of 6T:6I. PPA polymers 3A to 4B were obtained from Kuraray Co., LTD and are commercially available as Genestar™. PPA polymers 3A to 3C were PA9T isomeric copolymers, having a first recurring unit formed from the polycondensation of 1,9-nonanediamine ("NMDA") and terephthalic and a second recurring unit formed from the polycondensation of 2-methyl-1,8-octanediamine ("MODA") with terephthalic acid. For PPA polymers 3A to 3C, NODA:MODA was 50:50, while for PPA polymers 4A and 4B, NODA:MODA was 85:15. PPA polymer 5A was a PA10T polymer obtained from Kingfa Science and Technology Co., Ltd under the trade name Vicnyl.

Composite Fabrication

The PPA polymer and 0.5 wt % thermal stabilizer (Cu/KI) relative to total weight of the polymer matrix was ground using a standard laboratory mill. The powder was spread in between layers of woven carbon fiber fabric (TRX26 T300 NT, 6 k, 5H satin, 54" 373 gsm, desized, from Cytec Engineered Materials) which was sandwiched between two 2 mm stainless steel plates. A polyimide film (commercially available as Kapton® from DuPont USA) was placed on each side between the stainless steel plate and the fabric/resin. A 2 mm stainless steel spacer was also placed around the fabric/PPA polymer and between the two stainless steel plates. The entire assembly was transferred into a hot press. Melting and consolidation were done at maximum temperatures of 315-345° C. for 5 minutes with effective applied pressure of 81 pounds per square inch ("psi"). With temperature ramp and cool down, the total processing time was 35 minutes. For each resin system, thermoplastic composites (as laminates) with 6 layers of woven carbon fiber mat and 50 wt % resin were prepared following the method as described above. After the cycle and cooling to room temperature, the laminates were removed and analyzed for cracks.

Measurement of Properties

The PPA polymer melting temperature ("$T_m$") and heat of fusion ("$\Delta H_f$") were measured according to ASTM D3418 standard method using a differential scanning calorimeter (TA Instruments DSC Q20) and a liquid nitrogen cooling system operated with TA Thermal Advantage and Universal Analysis software. The measurements were carried out using a heating and cooling rates of 20° C./min. in a nitrogen atmosphere. The $T_m$ and $\Delta H_f$ values were determined from the second heating scan. The onset thermal degradation temperature ("$T_d$") was determined by thermogravimetric analysis following ASTM E1131-08 (TA Instruments TGA Q500, 10° C./min, 30° C. to 800° C., under nitrogen atmosphere). The $T_d$ values were identified when the rate of weight loss is 0.1 wt % per minute using the $1^{st}$ derivative of the weight loss curve as a function of temperature.

The inherent viscosity of the PPA polymers was measured following ASTM D5336. The sample was dissolved in phenol-tetrachloroethane (P:TCE=60:40) as solvent by placing the mixture in a heating block set at 100° C. for 45 minutes. After cooling, the solution was injected into Viscotek Viscometer (Y500 series) equipped with dispensing pump and autosampler. The equipment calculated IV values for each sample solution.

To determine the presence of cracking in the composites, the laminates were cut using wet-saw and 20×20 mm specimens were taken for microscopy evaluation. The specimens were imbedded in epoxy mounts with the specimen perpendicular to the mount surface. The mount was then polished according to standard procedures for microscopy sample preparation. Once the desired surface quality was achieved, the specimens were examined under optical microscope and/or scanning electron microscope ("SEM"). For SEM analysis, the samples were sputtered with thin layer of gold. Some of the samples showed visible cracks under optical microscope and were not further analyzed in SEM. Samples that did not show cracking under the optical microscope were further analyzed using SEM to see if any smaller cracks, not seen in optical microscope, were present. Any cracks found on the specimens regardless of the size were noted (i.e. yes if at least 1 crack was observed either from optical microscope or SEM evaluation).

Results

Samples parameters, property measurements and crack testing results are displayed in Table 1, below.

| Example | PPA | Composition | $T_m$ (° C.) C. | $\Delta H_f$ (J/g) J/g | $T_d$ (° C.) C. | $T_d - T_m$ (° C.) C. | IV (dL/g) dL/g | Cracks in Composites? |
|---|---|---|---|---|---|---|---|---|
| 1 | 1A | PA6T, 6I (6T:6I = 50:50) | 270 | 24 | 375 | 105 | 0.84 | No |
| 2 | 2A | PA6T, 6I (6T:6I = 70:30) | 318 | 51 | 375 | 57 | 0.62 | Yes |
|   | 2B |  |  |  |  |  | 0.90 | Yes |
|   | 2C |  |  |  |  |  | 0.94 | — |
| 3 | 3A | PA9T | 267 | 31 | 368 | 101 | 0.79 | Yes |
|   | 3B | NMDA:MODA = (50:50) |  |  |  |  | 1.06 | No |
|   | 3C |  |  |  |  |  | 1.14 | No |
| 4 | 4A | PA9T | 291, 304 | 63 | 368 | 64 | 0.79 | Yes |

| Example | PPA | Composition | $T_m$ (°C.) C. | $\Delta H_f$ (J/g) J/g | $T_d$ (°C.) C. | $T_d - T_m$ (°C.) C. | IV (dL/g) dL/g | Cracks in Composites? |
|---|---|---|---|---|---|---|---|---|
|  | 4B | NMDA:MODA = 85:15 |  |  |  |  | 0.98 | Yes |
| 5 | 5A | PA10T | 304, 315 | 69 | 370 | 55 | 0.89 | — |

Referring to Table 1, composites samples having $\eta_{inh} \geq 0.8$ dL/g; $\Delta H_f \leq 50$ J/g and $(T_d - T_m) \geq 60°$ C., did not exhibit cracking while samples having $\eta_{inh}$, $\Delta H_f$ and $(T_d - T_m)$ outside the aforementioned ranges all exhibited cracking. Cracks in laminates made with polymer 2C and 5A were difficult to assess due to incomplete impregnation of the carbon fibers.

The invention claimed is:

1. A thermoplastic composite comprising:
   at least 20 wt. %, relative to the total weight of the thermoplastic composite, of a polymer matrix comprising at least one semi-crystalline polyphthalamide ("PPA") polymer and
   at least 45 wt. %, relative to the total weight of the thermoplastic composite, of at least one continuous reinforcing fiber, wherein the at least one continuous reinforcing fiber is a carbon fiber;
   wherein the at least one semi-crystalline PPA polymer comprises recurring units ($R_{PA}$) and ($R^*_{PA}$) represented by the following formulae, respectively $[-M_A-M_B-]$ (1) and $[-M^*_A-M^*_B-]$ (2), and wherein
   (i) $-M_A-$ and $-M^*_A-$ are respectively represented by the following formula:

 (3) and

 (4), (ii) $-M_B-$ is represented by the following formula:

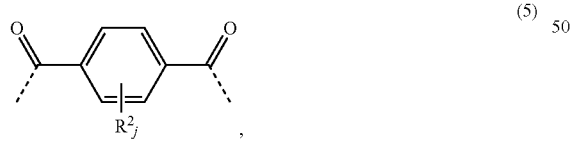 (5)

and
   (iii) $-M_B^*-$ is represented by one of the following formulae:

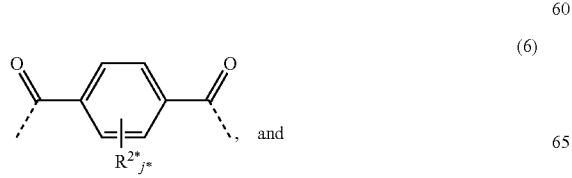 (6)

and

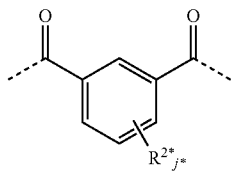 (7)

and
   wherein
   (i) $R^1$, $R^2$, $R^{1*}$ and $R^{2*}$, at each instance, is independently selected from the group consisting of a halogen, an alkyl, an alkenyl, an ether, a thioether, an ester, an amide, an imide, an alkali or alkaline earth metal sulfonate, an alkyl sulfonate, an alkali or alkaline earth metal phosphonate, an alkyl phosphonate, an amine, and an quaternary ammonium;
   (ii) i and i*, at each instance, is an independently selected integer from 0 to 2;
   (iii) j and j* are independently selected integers from 0 to 4;
   (iv) n and n* are independently selected integers from 5 to 9; and
   wherein, either
   (i) $-M_A-$ and $-M^*_A-$ are the same and $-M_B-$ and $-M^*_B-$ are distinct;
   (ii) $-M^*_B-$ represented by Formula (7);
   (iii) moles recurring unit ($R_{PA}$):moles recurring ($R^*_{PA}$) is no more than 65:35;
   or
   (iv) $-M_A-$ and $-M^*_A-$ are distinct and $-M_B-$ and $-M^*_B-$ are the same;
   (v) n is 9 and n* is 8;
   (vi) $-M^*_A-$ comprises at least one $R^{1*}$ represented by the formula: $-(CH_2)_m-(CH_3)$, where m is an integer from 0 to 3;
   (vii) $-M^*_B-$ is represented by Formula (6) and
   (viii) moles recurring unit ($R_{PA}$):moles recurring ($R^*_{PA}$) is no more than 55:45; and
   wherein the at least one semi-crystalline polymer has
   (i) an inherent viscosity ("$\eta_{inh}$") of at least 0.8 deciliters per gram ("dL/g"), as measured according to ASTM D5336,
   (ii) a heat of fusion ("$\Delta H_f$") of no more than 50 Joules per gram ("J/g"), as measured according to ASTM D3418 using a heating and cooling rate of 20° C./min, and
   (iii) a difference between an onset degradation temperature ("$T_d$") and melting temperature ("$T_m$"), $T_d-T_m$, that is at least 60° C., wherein $T_d$ is measured according to ASTM E1131-08 using a heating rate of 10° C./min. and $T_m$ is measured according to ASTM D3418 using a heating and cooling rate of 20° C./min;
   wherein the thermoplastic composite is selected from the group consisting of a unidirectional composite and a multidirectional composite.

2. The composite of claim 1, wherein the concentration of the reinforcing fiber is at least 50 wt. %, relative to the total weight of the thermoplastic composite.

3. The composite of claim 1, wherein the concentration of the reinforcing fiber is no more than 70 wt. % relative to the total weight of the thermoplastic composite.

4. The composite of claim 1, wherein the thermoplastic composite is a unidirectional composite wherein the reinforcing fibers are oriented as a tape.

5. The composite of claim 1, wherein the thermoplastic composite is a multidirectional composite wherein the reinforcing fibers are in a configuration selected from the group consisting of a woven fabric, a layered fabric, and a combination thereof.

6. The composite of claim 1, wherein -$M_A$- and -$M^*_A$- are the same and -$M_B$- and -$M^*_B$- are distinct and wherein
   (i) -$M_A$- and -$M^*_A$- are diradicals of a diamine selected from the group consisting of 1,5-diaminopentane; 2-methyl-1,5-diaminopentane; 1,6-hexamethylenediamine; 3-methyl-1,6-hexamethylenediamine; 2,5-dimethyl-1,6-hexamethylenediamine; 2,2,4-trimethyl-1,6-hexamethylenediamine; 2,4,4-trimethyl-1,6-hexamethylenediamine; 1,7-diaminoheptane; 1,8-diaminooctane; 2-methyl-1,8-octanediamine ("MODA") and 1,9-diaminononane ("NMDA"), and
   (ii) -$M_B$- is a terephthalic acid diradical and -$M^*_B$- is an isophthalic acid diradical.

7. The composite of claim 1, wherein -$M_A$- and -$M^*_A$- are distinct and -$M_B$- and -$M^*_B$- are the same, and wherein
   (i) -MA- is a NMDA diradical;
   (ii) -M*A- is a MODA diradical: and
   (iii) -$M_B$- and -$M^*_B$- are terephthalic acid diradicals.

8. The composite of claim 1, wherein the polymer matrix comprises at least 70 wt. % of the at least one semi-crystalline PPA polymer, relative to the total weight of the polymer matrix.

9. The composite of claim 1, further comprising, relative to the total weight of the polymer matrix, from about 0.1 to about 10 wt. % of at least one additive selected from the group consisting of antioxidants, processing aids, nucleating agents, lubricants, flame retardants, smoke-suppressing agents, anti-static agents, anti-blocking agents, and conductivity additives.

10. The composite of claim 9, wherein the additive is an antioxidant.

11. The composite of claim 1, wherein the concentration of the polymer matrix is at least 30 wt. %, and no more than 55 wt. % relative to the total weight of the thermoplastic composite.

12. An article comprising the thermoplastic composite of claim 1, wherein the article is selected from the group consisting of an automotive component, an aerospace component, an oil and gas drilling component, and a mobile electronic device component.

13. A method for making the composite of claim 1, the method comprising
   (i) impregnating the reinforcing fibers with the polymer matrix, wherein the impregnating comprises contacting the reinforcing fibers with a melt of the polymer matrix material, wherein the melt is at a temperature of at least Tm* to less than Td*, where Tm* is the melt temperature ("$T_m$") of the PPA polymer in the polymer matrix having the highest melt temperature, and Td* is the onset decomposition temperature ("$T_d$") of the PPA polymer having the lowest onset decomposition temperature in the melt, and
   (ii) cooling the impregnated reinforcing fibers to room temperature.

14. The composite of claim 1, wherein
   (iv) -$M_A$- and -$M^*_A$- are distinct and -$M_B$- and -$M^*_B$- are the same;
   (v) n is 9 and n* is 8;
   (vi) -$M^*_A$- comprises at least one $R^{1*}$ represented by the formula: —$(CH_2)_m$—$(CH_3)$, where m is an integer from 0 to 3;
   (vii) -$M^*_B$- is represented by Formula (6) and
   (viii) moles recurring unit ($R_{PA}$):moles recurring ($R^*_{PA}$) is no more than 50:50.

* * * * *